United States Patent
Ren et al.

(10) Patent No.: US 7,149,166 B2
(45) Date of Patent: Dec. 12, 2006

(54) OPTICAL RECORDING SYSTEM WITH A BUILT-IN JITTER DETECTOR

(75) Inventors: Tsung-Huei Ren, Taipei (TW); Chi-Mou Chao, Taipei (TW)

(73) Assignee: Mediatek Incorporation, Hsin-Chu Hsien (TW)

( * ) Notice: Subject to any disclaimer, the term of this patent is extended or adjusted under 35 U.S.C. 154(b) by 519 days.

(21) Appl. No.: 10/604,426

(22) Filed: Jul. 21, 2003

(65) Prior Publication Data

US 2004/0136301 A1 Jul. 15, 2004

(30) Foreign Application Priority Data

Jul. 25, 2002 (TW) .............................. 91116646 A

(51) Int. Cl.
G11B 20/20 (2006.01)
G11B 20/18 (2006.01)

(52) U.S. Cl. ................................ 369/47.33; 369/53.36
(58) Field of Classification Search ...................... None
See application file for complete search history.

(56) References Cited

U.S. PATENT DOCUMENTS 5,663,942 A * 9/1997 Ishibashi et al. .......... 369/53.34
6,333,905 B1 * 12/2001 Kobayashi et al. ....... 369/59.11
2001/0006500 A1 * 7/2001 Nakajima et al. ........ 369/47.35

* cited by examiner

*Primary Examiner*—William Korzuch
*Assistant Examiner*—Christopher Lamb
(74) *Attorney, Agent, or Firm*—Winston Hsu

(57) ABSTRACT

An optical recording system for burning an optical disc includes a housing, a laser pickup installed inside the housing for writing data onto the optical disc according to a write strategy and reading an RF signal from the optical disc, a laser drive connected to the laser pickup for controlling operations of the laser pickup, a read channel installed connected to the laser pickup for processing the RF signal received by the laser pickup, a jitter meter installed inside the housing connected to the read channel for generating delay signals according to the processed RF signal, and a digital signal processor connected to the laser drive and the jitter meter for receiving the delay signals, configuring the write strategy according to the delay signals, and controlling the laser drive to control the laser pickup to write data onto the optical disc according to the configured write strategy.

12 Claims, 4 Drawing Sheets

OPTICAL RECORDING SYSTEM WITH A BUILT-IN JITTER DETECTOR

BACKGROUND OF INVENTION

1. Field of the Invention

The present invention provides an optical recording system, and more particularly, an optical recording system which has a built-in jitter meter.

2. Description of the Prior Art

Data are written onto an optical disc with 3T to 11T pulse trains. All CD-R/RW drives use Optimum Power Control (OPC) to set the laser power for a specific disc type. Vendor supplied information in the ATIP (vendor, dye type, maximum recording length, supported write speeds, etc.), is used to set the initial "best guess" laser power. A test burn in a reserved area of the disc using power levels in a wide range above and below this initial setting, and analysis of the test burn, results in an 'optimum' setting for the recording using one of those levels. However, the "optimum" setting may not always be optimal because the write strategy may be different for writing data onto different portion of the same disc and for writing data with different length of pulse trains.

Please refer to FIG. 1. FIG. 1 is a flowchart of a related art method for configuring a write strategy. In step 1, the optical recorder is provided with a write strategy. In step 3, a test burn is performed to write test data onto a disc. In step 5, the test data is read from the disc and evaluated to check the burning quality. If the test data has acceptable quality, then perform step 7 to configure the write strategy used for burning the test data as the write strategy for burning formal data. If the test data has unacceptable quality, then perform step 9 to reconfigure the write strategy and repeat step 3 until the test data has acceptable quality.

It can be seen that the write strategy has to be fine-tuned several times before an acceptable write strategy can be configured. Further, the signal quality needs to be evaluated with an externally connected test equipment or jitter. The externally connected test equipment or jitter is very expensive and requires professional skill to operate. An ordinary user cannot possibly operate such equipment to configure the write strategy for an optical disc.

SUMMARY OF INVENTION

It is therefore an objective of the present invention to provide an optical disc system which has a built-in jitter meter to solve the above mentioned problems.

According to the claimed invention, the optical recording system for burning an optical disc comprises a housing, a laser pickup installed inside the housing for writing data onto the optical disc according to a write strategy and reading an RF signal from the optical disc, a laser drive installed inside the housing connected to the laser pickup for controlling operations of the laser pickup, a read channel installed inside the housing connected to the laser pickup for processing the RF signal received by the laser pickup, a jitter meter installed inside the housing connected to the read channel for generating delay signals according to the processed RF signal, and a digital signal processor installed inside the housing connected to the laser drive and the jitter meter for receiving the delay signals, configuring the write strategy according to the delay signals, and controlling the laser drive to control the laser pickup to write data onto the optical disc according to the configured write strategy.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
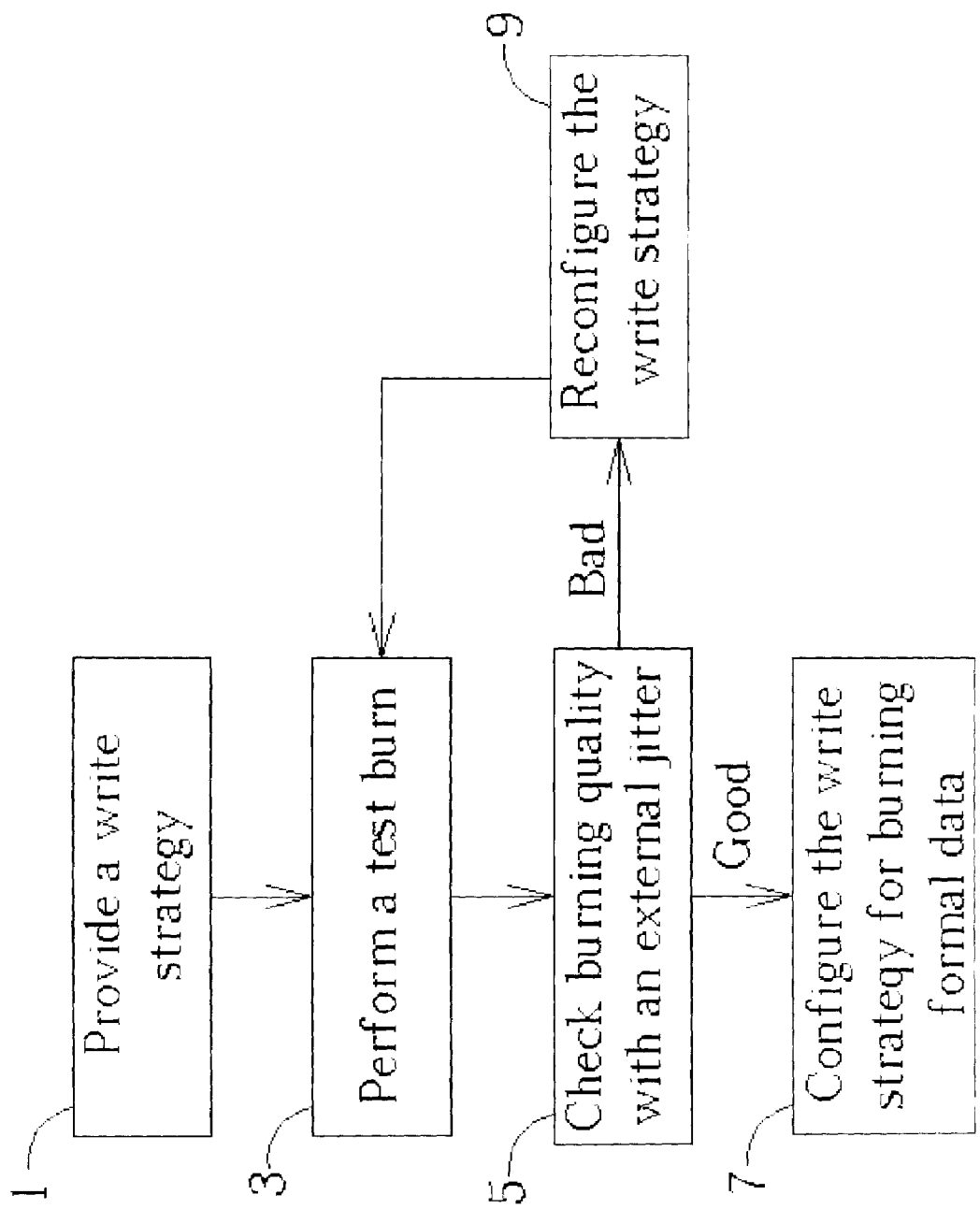
FIG. 1 is a flowchart of a related art method for configuring a write strategy.
Figure 2:
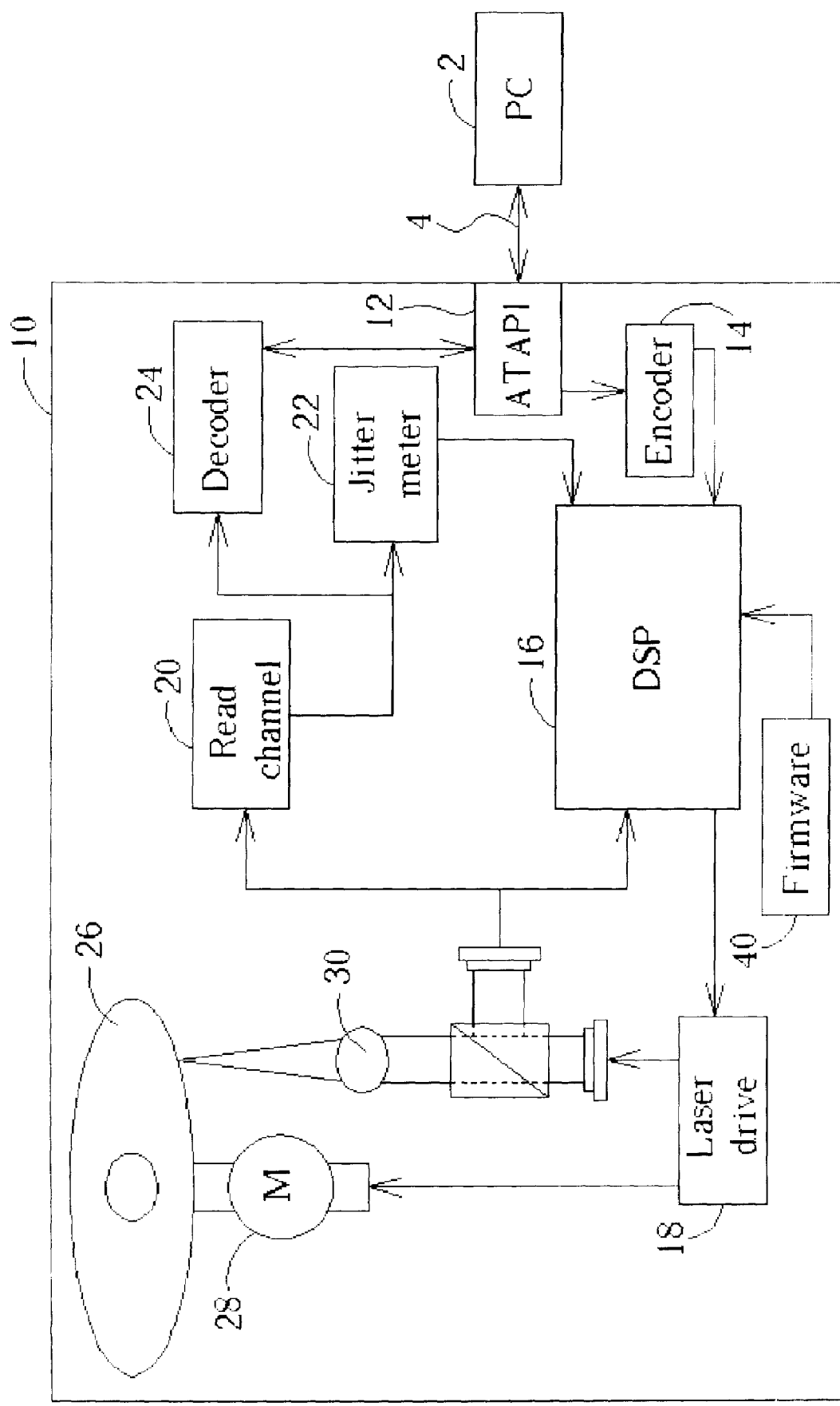
FIG. 2 is a functional block diagram of an optical disc system according to the present invention.

Please refer to FIG. 2. FIG. 2 is a functional block diagram of an optical disc system according to the present invention. The optical disc system comprises a personal computer 2 and an optical recorder 10 connected to the personal computer 2 via a bus 4. The optical recorder 10 comprises an ATAPI (AT attachment packet interface) 12, an encoder 14, a digital signal processor 16, a laser drive 18, a read channel 20, a jitter meter 22, a decoder 24, an optical disc 26, a disc motor 28, a laser pickup 30 and firmware 40.

The optical recorder 10 writes data onto the optical disc 26 in the following manner. The personal computer 2 transmits data to be written and other relevant control data to the ATAPI 12 of the optical recorder 10 via the bus 4. The data is then passed to the encoder 14 for encoding. The encoded data is transmitted to the digital signal processor 16 for processing. And the processed data is transmitted to the laser drive 18 to control the disc motor 28 and the laser pickup 30 for writing data onto the optical disc 26.

Data is read from the optical disc 26 in the following manner. The digital signal processor 16 sends control signals to the laser drive 18 to control the disc motor 28 and the laser pickup 30. The laser pickup 30 then reads a radio frequency signal from the optical disc 26. The RF signal is sent to the read channel 20 for amplification and converting into a digital signal. The digital signal is then decoded by the decoder 24 and outputted to the personal computer 2 via the ATAPI 12.

Before a piece of data is written onto the optical disc 26, the laser drive 18 must know the length of the piece of data. And then the laser drive 18 provides a corresponding write strategy according burning parameters for writing the piece of data onto the optical disc 26. The write strategy needs to be fine tuned according to the material and manufacturer of the optical disc 26. Otherwise, a false write strategy may cause the optical disc 26 to be unreadable or cause other unexpected failures.

The write strategy is fine tuned by writing test data onto a lead-in area of the optical disc 26 and reading the test data from the lead-in area before formal data is written onto the optical disc 26. The test write process is the same as writing formal data onto the optical disc 26. However, the test read process is not identical to reading formal data from the optical disc 26. After the laser pickup 30 transfers the RF signal to the read channel 20 for processing, the processed RF signal is sent to the decoder 24 for decoding and sent to the jitter meter 22 for measuring a difference between the processed RF signal and a standard clock. The difference is then outputted to the digital signal processor 16 for calculating the burning quality under the write strategy used for writing the test data. This information will allow the digital signal processor 16 to adjust the speeds and positions of the disc motor 28 and the laser pickup 30 continuously.

Figure 3:
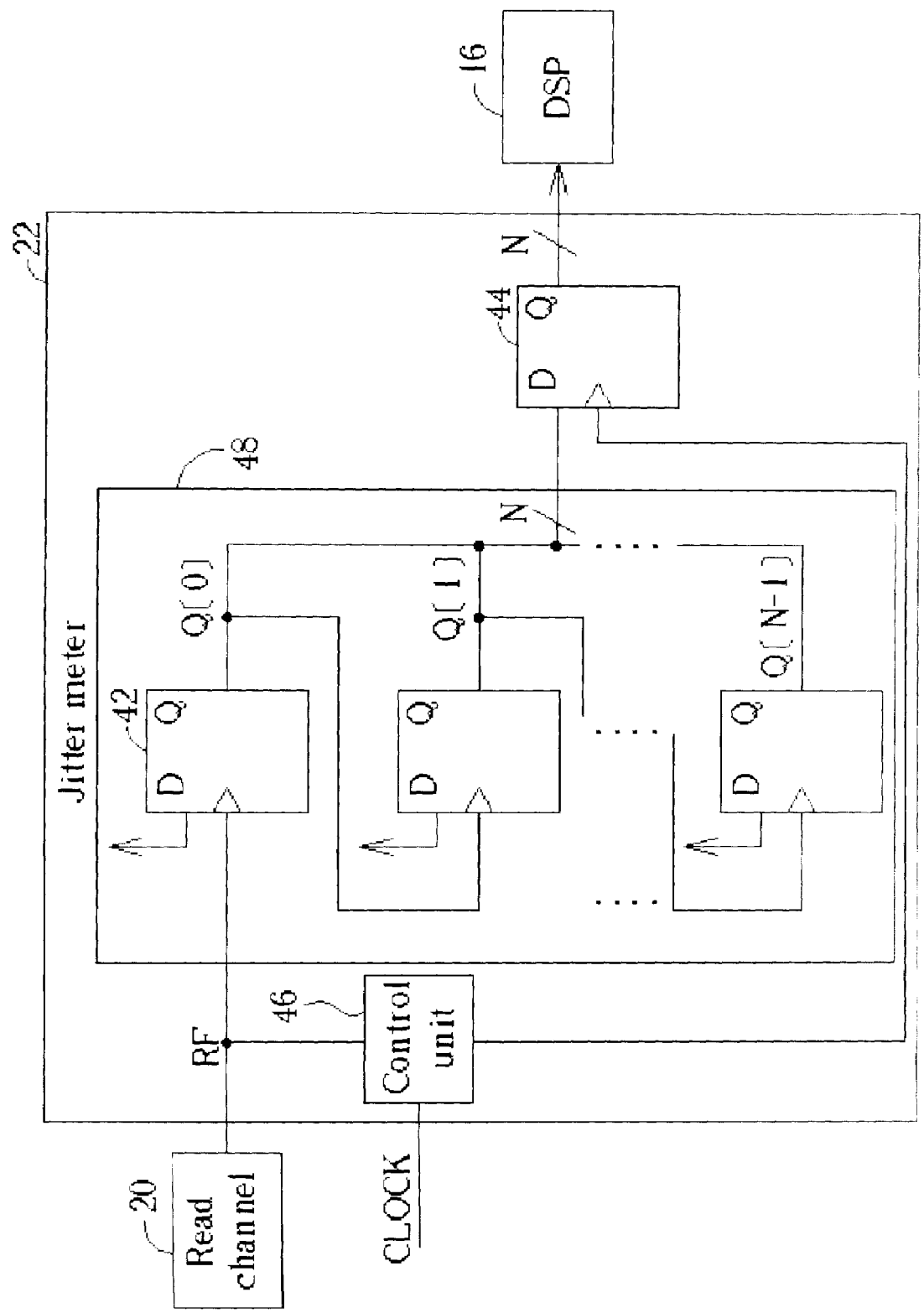
FIG. 3 is a block diagram of the jitter meter in FIG. 2.

Please refer to FIG. 3. FIG. 3 is a block diagram of the jitter meter 22. The jitter meter 22 comprises a delay chain 48 formed by N delay cells 42 connected in a cascade manner, a buffer set 44 formed by N buffers, and a control unit 46. Each of the delay cells 42 is a D flip-flop which can either be rising-edge triggered or falling-edge triggered. Each of the delay cells 42 delays its input signal a time unit. The N delay cells 42 are used to delay the processed RF signal N different periods of time. Therefore, the outputs Q of the N delay cells 42 will generate delayed RF signals with N different periods of delay time. The input D of each delay cell 42 is connected to a logic "1". The clock input of the first delay cell 42 is connected to the read channel 20 for receiving the processed RF signal. The clock input of each of the remaining delay cells 42 is connected to the output Q of a previous delay cell 42. The control unit 46 has a first input connected to the read channel 20 for receiving the processed RF signal, a second input for receiving the standard clock, and an output for outputting a control signal. After the processed RF signal changes value, the control signal will change its value shortly after receiving a falling edge of the standard clock. The output of the control unit 46 is connected to the clock input (CLK) of the buffer set 44. The outputs Q of the N delay cells 42 are connected to inputs of the N buffers of the buffer set 44. The time for the N buffers to receive outputs of the N delay cells 42 is controlled by the control signal outputted by the control unit 46. When the clock input (CLK) of the buffer set 44 is triggered by a change in the logic value of the control signal, the current logic values of the outputs Q of the N delay cells 42 will be stored into the N buffers of the buffer set 44.

Figure 4:
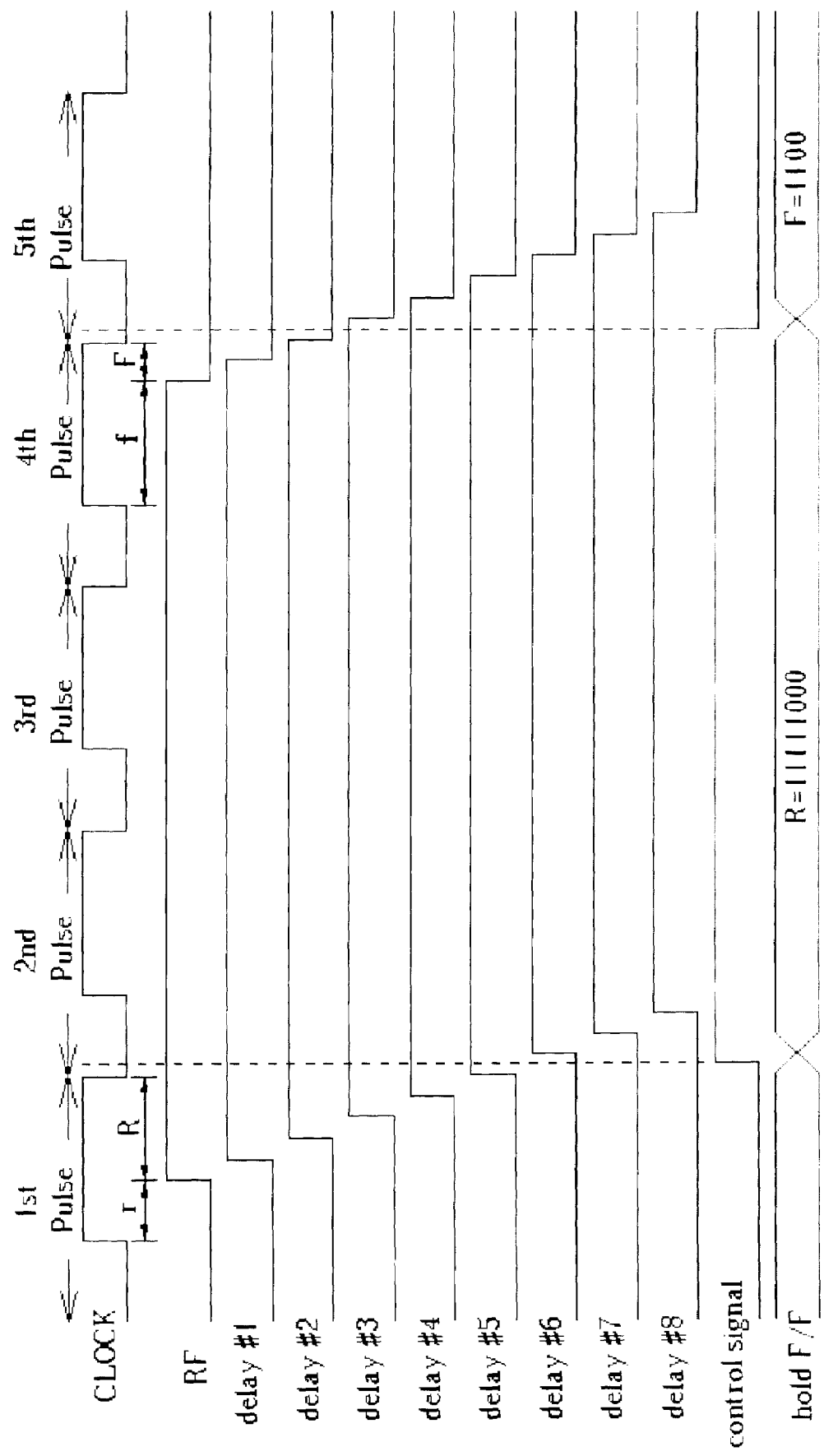
FIG. 4 is a timing diagram of the jitter meter in FIG. 2.

Please refer to FIG. 4. FIG. 4 is a timing diagram of the jitter meter 22. The timing diagram include waveforms of the standard clock, the processed RF signal, the delayed RF signals, the control signal and logic values stored in the N buffers of the buffer set 44. The delayed RF signals are illustrated by delay #1 to delay #8. In this case, the buffer set 44 include 8 buffers. The length of the high potential of the processed RF signal represents the length of the test data written onto the optical disc 26. As shown in FIG. 4, the high potential of the processed RF signal crosses three falling-edges of the standard clock, therefore the test data represented by this section of the processed RF signal is a 3T signal. While a first pulse of the standard clock is at a high potential, the processed RF signal changes from a low potential to a high potential. Therefore, the control unit 46 outputs a high-potential control signal shortly after receiving a falling edge of the standard clock. As soon as the clock input of the buffer set 44 receives the high-potential control signal, the buffer set 44 stores an 8-bit delay signal transmitted from the eight delay cells 42 of the delay chain 48. This 8-bit delay signal is named R delay signal. As illustrated in FIG. 4, when the control signal changes from a low potential to a high potential, delay #1 to delay #5 have a logic "1", delay #6 to delay #8 have a logic "0", thus R delay signal is "11111000".

During the fourth pulse of the standard clock, the processed RF signal changes from a high potential to a low potential. Therefore, the control unit 46 outputs a low-potential control signal shortly after receiving a falling edge of the standard clock. As soon as the clock input of the buffer set 44 picks up the low-potential control signal, the buffer set 44 stores an 8-bit delay signal transmitted from the eight delay cells 42 of the delay chain 48. This 8-bit delay signal is named F delay signal. As illustrated in FIG. 4, when the control signal changes from a high potential to a low potential, delay #1 and delay #2 have a logic "0", delay #3 to delay #8 have a logic "1", thus F delay signal is "00111111".

After the buffer set 44 receives R and F delay signals, these two delay signals are sent to the digital signal processor 16, and the firmware 40 will control the operation of the digital signal processor 16. The number of logic "1" of R delay signal and the number of logic "0" of F delay signal are counted and subtracted to find a difference between the two numbers. The difference is then mapped to a value between 0 and 1. Since the number of logic "1" of R delay signal is 5, and the number of logic "0" of F delay signal is 2, the difference between the two numbers is 3, and the mapped value is 0.375 (3/8). This process will be repeated to find an average difference between the R and F delay signals. If the average difference is 2.8, then the digital signal processor 16 will adjust the write strategy according to this average difference. An average difference closer to 0 commonly refers to a better corresponding write strategy.

From these calculations, the digital signal processor 16 will determine whether the write strategy for writing the test data conforms to parameters and arithmetic formula stored in the firmware 40. If so, the jitter meter 22 will no longer be used and the optical recorder 10 can start to write formal data. If not, the jitter meter 22 will be used again until an acceptable write strategy is configured.

In the past, generating an acceptable write strategy used to be a complicated and time consuming task. Compared to the related art, the jitter meter 22 is installed inside the optical recorder 10. Therefore the jitter meter 22 can be used to help configuring an acceptable write strategy for various optical discs easily. And there is no need to connect the optical recorder 10 to an externally connected jitter meter.

Those skilled in the art will readily observe that numerous modifications and alterations of the system may be made while retaining the teachings of the invention. Accordingly, the above disclosure should be construed as limited only by the metes and bounds of the appended claims.

What is claimed is:

1. An optical recording system for burning an optical disc, the optical recording system comprising:
    a housing;
    a laser pickup installed inside the housing for writing data onto the optical disc according to a write strategy and reading an RF signal from the optical disc;
    a laser drive installed inside the housing connected to the laser pickup for controlling operations of the laser pickup;
    a read channel installed inside the housing connected to the laser pickup for processing the RF signal received by the laser pickup;
    a jitter meter installed inside the housing connected to the read channel for generating delay signals according to the processed RF signal; and
    a digital signal processor installed inside the housing connected to the laser drive and the jitter meter for receiving the delay signals, configuring the write strategy according to the delay signals, and controlling the laser drive to control the laser pickup to write data onto the optical disc according to the configured write strategy;
    wherein the jitter meter includes:
    a delay chain having a plurality of delay cells connected in a cascade manner, each delay cell delaying an input signal a time unit;
    a buffer set connected to the delay chain for storing a delay signal received from the delay chain, the buffer set having a plurality of buffers each connected to a delay cell for receiving a delay bit of the delay signal transmitted from the delay cell; and a control unit connected to the read channel and the buffer set for outputting a control signal according to a standard clock and the processed RF signal.

2. The optical recording system of claim 1 wherein each of the delay cells is a flip-flop.

3. The optical recording system of claim 2 wherein the flip-flop is either rising-edge triggered or falling-edge triggered.

4. The optical recording system of claim 1 wherein the optical disc comprises a lead-in area, the processed RF signal sent to the jitter meter being generated from an RF signal read from the lead-in area of the optical disc.

5. The optical recording system of claim 1 further comprising firmware for storing parameters and arithmetic formula.

6. A method for burning an optical disc in an optical recording system comprising the following steps:
    (a) writing data onto the optical disc according to a write strategy and reading an RF signal from the optical disc;
    (b) processing the RF signal;
    (c) generating delay signals according to the processed RF signal by:
        delaying the processed RF signal;
        outputting a control signal according to a standard clock and the processed RF signal; and
        generating a delay signal according to the control signal and the delayed RF signals; and
    (d) configuring the write strategy according to the delay signals;
    wherein the delay signal is formed by a plurality of delay bits received from a plurality of buffers, each buffer connected to a delay cell from a plurality of delay cells, the plurality of delay cells being connected in a cascade manner.

7. The method of claim 6 wherein the RF signal is read from a lead-in area of the optical disc.

8. The method of claim 6 wherein the write strategy in step (d) is configured according to the material and manufacturer of the optical disc.

9. An optical recording system for burning an optical disc, the optical recording system comprising:
    a housing;
    a laser pickup installed inside the housing for writing data onto the optical disc according to a write strategy and reading an RF signal from the optical disc;
    a laser drive installed inside the housing connected to the laser pickup for controlling operations of the laser pickup;
    a read channel installed inside the housing connected to the laser pickup for processing the RF signal received by the laser pickup;
    a jitter meter installed inside the housing connected to the read channel for generating delay signals according to the processed RF signal; and
    a digital signal processor installed inside the housing connected to the laser drive and the jitter meter for receiving the delay signals, configuring the write strategy according to the delay signals, and controlling the laser drive to control the laser pickup to write data onto the optical disc according to the configured write strategy;
    wherein the jitter meter includes:
        a delay chain having a plurality of delay cells connected in a cascade manner, wherein the processed RF signal is coupled to a clock input of a first delay cell, and an output of each delay cell is coupled to a clock input of a following delay cell, each delay cell delaying an input signal a time unit;
        a buffer set connected to the delay chain for storing a delay signal received from the delay chain; and
        a control unit connected to the read channel and the buffer set for outputting a control signal according to a standard clock and the processed RF signal.

10. The optical recording system of claim 9 wherein the buffer set comprises a plurality of buffers each connected to a delay cell for receiving a delay bit of the delay signal transmitted from the delay cell.

11. A method for burning an optical disc in an optical recording system comprising:
    (a) writing data onto the optical disc according to a write strategy and reading an RF signal from the optical disc;
    (b) processing the RF signal;
    (c) generating delay signals according to the processed RF signal by:
        delaying the processed RF signal with a delay chain having a plurality of delay cells connected in a cascade manner, the processed RF signal coupled to a clock input of a first delay cell, and an output of each delay cell coupled to a clock input of a following delay cell;
        outputting a control signal according to a standard clock and the processed RF signal; and
        generating a delay signal according to the control signal and the delayed RF signals; and
    (d) configuring the write strategy according to the delay signals.

12. The method of claim 11 wherein the delay signal is formed by a plurality of delay bits received from a plurality of buffers, each buffer connected to a delay cell.

* * * * *